United States Patent
Zalusky et al.

(10) Patent No.: US 8,253,086 B2
(45) Date of Patent: Aug. 28, 2012

(54) POLAR MOUNTING ARRANGEMENT FOR A SOLAR CONCENTRATOR

(75) Inventors: James Thomas Zalusky, Beavercreek, OH (US); Terry L. Zahuranec, North Olmsted, OH (US)

(73) Assignee: MH Solar Co., Ltd., Taipei (TW)

( * ) Notice: Subject to any disclaimer, the term of this patent is extended or adjusted under 35 U.S.C. 154(b) by 446 days.

(21) Appl. No.: 12/496,034

(22) Filed: Jul. 1, 2009

(65) Prior Publication Data

US 2010/0000519 A1    Jan. 7, 2010

Related U.S. Application Data

(60) Provisional application No. 61/078,256, filed on Jul. 3, 2008.

(51) Int. Cl.
*G02B 7/04* (2006.01)
*G02B 27/40* (2006.01)
*G02B 27/64* (2006.01)

(52) U.S. Cl. ............... 250/201.3; 250/203.3; 250/203.4; 353/3; 136/244

(58) Field of Classification Search ............... 250/201.1, 250/203.1–203.4; 136/244, 245, 246; 353/3
See application file for complete search history.

(56) References Cited

U.S. PATENT DOCUMENTS

| | | |
|---|---|---|
| 3,696,286 A | 10/1972 | Ule |
| 3,797,476 A | 3/1974 | Tarcici |
| 3,985,579 A | 10/1976 | Rahilly |
| 4,154,219 A | 5/1979 | Gupta et al. |
| 4,178,913 A | 12/1979 | Hutchison |
| 4,202,321 A | 5/1980 | Volna |
| 4,219,729 A | 8/1980 | Smith |
| 4,223,214 A | 9/1980 | Dorian et al. |
| 4,248,643 A | 2/1981 | Peters |
| 4,249,514 A | 2/1981 | Jones |
| 4,262,195 A | 4/1981 | White et al. |
| 4,296,731 A | 10/1981 | Cluff |
| 4,315,163 A | 2/1982 | Bienville |
| 4,328,789 A | 5/1982 | Nelson |
| 4,354,484 A | 10/1982 | Malone et al. |
| 4,364,183 A | 12/1982 | Rhodes |
| 4,392,008 A | 7/1983 | Cullis |
| 4,409,422 A | 10/1983 | Sater |
| 4,445,030 A | 4/1984 | Carlton |

(Continued)

FOREIGN PATENT DOCUMENTS

CA    1 132 869    10/1982

(Continued)

OTHER PUBLICATIONS

International Search Report and Written Opinion mailed Nov. 10, 2009 for PCT Application No. PCT/US 09/49610, 25 pages.

(Continued)

*Primary Examiner* — Francis M Legasse, Jr.
(74) *Attorney, Agent, or Firm* — Turocy & Watson, LLP

(57) ABSTRACT

A solar collector can be rotated and tilted about a polar mount. The solar collector can be designed such that the center of gravity of the collector is aligned with the axis of the polar mount facilitating the use of smaller positioning devices. The collector can be placed in a position to prevent damage by inclement weather and allow easy access for maintenance and installation.

20 Claims, 12 Drawing Sheets

U.S. PATENT DOCUMENTS

| | | | |
|---|---|---|---|
| 4,496,787 A | 1/1985 | Touchais et al. | |
| 4,501,469 A | 2/1985 | Merges et al. | |
| 4,516,314 A | 5/1985 | Sater | |
| 4,583,520 A * | 4/1986 | Dietrich et al. | 126/606 |
| 4,656,996 A * | 4/1987 | Aharon | 126/600 |
| 4,720,170 A | 1/1988 | Learn, Jr. | |
| 4,771,764 A | 9/1988 | Cluff | |
| 5,022,929 A * | 6/1991 | Gallois-Montbrun | 136/246 |
| 5,125,743 A | 6/1992 | Rust et al. | |
| 5,187,361 A | 2/1993 | Ishii et al. | |
| 5,223,043 A | 6/1993 | Olson et al. | |
| 5,293,447 A | 3/1994 | Fanney | |
| 5,374,939 A | 12/1994 | Pullen | |
| 5,473,166 A | 12/1995 | Imai et al. | |
| 5,522,944 A | 6/1996 | Elazari | |
| 5,616,913 A | 4/1997 | Litterst | |
| 5,707,458 A | 1/1998 | Nagashima et al. | |
| 5,758,938 A | 6/1998 | Osterwisch | |
| 5,798,517 A | 8/1998 | Berger | |
| 5,862,799 A | 1/1999 | Yogev et al. | |
| 5,899,071 A | 5/1999 | Stone et al. | |
| 5,964,216 A | 10/1999 | Hoffschmidt et al. | |
| 5,982,481 A | 11/1999 | Stone et al. | |
| 6,018,122 A | 1/2000 | Hibino et al. | |
| 6,018,123 A | 1/2000 | Takada | |
| 6,080,927 A | 6/2000 | Johnson | |
| 6,123,067 A | 9/2000 | Warrick | |
| 6,127,620 A | 10/2000 | Tange et al. | |
| 6,281,426 B1 | 8/2001 | Olson et al. | |
| 6,284,968 B1 | 9/2001 | Niesyn | |
| 6,485,152 B2 | 11/2002 | Wood | |
| 6,597,709 B1 | 7/2003 | Diver, Jr. | |
| 6,662,801 B2 | 12/2003 | Hayden | |
| 6,704,607 B2 | 3/2004 | Stone et al. | |
| 6,848,442 B2 | 2/2005 | Haber | |
| 6,936,760 B2 | 8/2005 | Rogers et al. | |
| 6,984,050 B2 | 1/2006 | Nakamura | |
| 7,076,965 B2 | 7/2006 | Lasich | |
| 7,079,317 B2 | 7/2006 | Baun et al. | |
| 7,092,156 B2 | 8/2006 | Baun et al. | |
| 7,109,461 B2 | 9/2006 | Lasich | |
| 7,197,829 B2 | 4/2007 | Acres | |
| 7,357,132 B2 | 4/2008 | Hayden | |
| 7,709,730 B2 | 5/2010 | Johnson et al. | |
| 7,825,327 B2 | 11/2010 | Johnson et al. | |
| 7,834,303 B2 | 11/2010 | Fatehi et al. | |
| 7,873,490 B2 | 1/2011 | MacDonald | |
| 2001/0036024 A1 | 11/2001 | Wood | |
| 2002/0179138 A1 | 12/2002 | Lawheed | |
| 2003/0045949 A1 | 3/2003 | Stone et al. | |
| 2004/0216777 A1 | 11/2004 | Pan | |
| 2005/0016581 A1 | 1/2005 | Fujisaki et al. | |
| 2005/0109387 A1 | 5/2005 | Marshall | |
| 2007/0034205 A1 | 2/2007 | Watts | |
| 2007/0095341 A1 | 5/2007 | Kaneff | |
| 2007/0145252 A1 | 6/2007 | Litchfield et al. | |
| 2007/0150198 A1 | 6/2007 | MacDonald | |
| 2007/0151245 A1 | 7/2007 | Coffey et al. | |
| 2007/0215198 A1 | 9/2007 | Jiang et al. | |
| 2007/0227574 A1 | 10/2007 | Cart | |
| 2007/0251564 A1 | 11/2007 | Smith | |
| 2007/0251569 A1 | 11/2007 | Shan et al. | |
| 2008/0011288 A1 | 1/2008 | Olsson | |
| 2008/0017784 A1 | 1/2008 | Hoot et al. | |
| 2008/0018995 A1 | 1/2008 | Baun | |
| 2008/0040990 A1 | 2/2008 | Vendig et al. | |
| 2008/0087318 A1 | 4/2008 | Jwo | |
| 2008/0128559 A1 | 6/2008 | Ho et al. | |
| 2009/0056699 A1 | 3/2009 | Mills et al. | |
| 2009/0114211 A1 | 5/2009 | Homyk et al. | |
| 2009/0126774 A1 | 5/2009 | Taylor et al. | |
| 2009/0205637 A1 | 8/2009 | Moore et al. | |
| 2009/0293861 A1 | 12/2009 | Taylor et al. | |
| 2010/0000519 A1 | 1/2010 | Zalusky et al. | |
| 2010/0000522 A1 | 1/2010 | Zahuranec | |
| 2010/0006139 A1 | 1/2010 | Zahuranec et al. | |
| 2010/0263659 A9 | 10/2010 | Taylor et al. | |
| 2011/0048403 A1 | 3/2011 | Stavrou et al. | |

FOREIGN PATENT DOCUMENTS

| | | |
|---|---|---|
| CN | 101093114 A | 12/2007 |
| EP | 1919029 | 5/2008 |
| GB | 2 426 324 A | 11/2006 |
| JP | 62166110 | 7/1987 |
| JP | 63096447 A | 4/1988 |
| JP | 7 038 131 A | 2/1995 |
| JP | 8130322 | 5/1996 |
| JP | 2001053322 | 2/2001 |
| JP | 2004-312054 A | 11/2004 |
| JP | 2005018352 A | 1/2005 |
| JP | 2005038270 | 2/2005 |
| KR | 100343263 B1 | 6/2002 |
| WO | 2008003023 | 1/2008 |
| WO | 2008013976 A2 | 1/2008 |
| WO | 2008117297 A2 | 10/2008 |

OTHER PUBLICATIONS

OA dated Apr. 28, 2011 for U.S. Appl. No. 12/495,164, 33 pages.

Building Integrated, Infrastructure, and Utility Scale Solar Power. http://www.power-spar.com/Power-Spar/index.phpwww.powerspar.com. Last accessed Aug. 14, 2009, 1 page.

Sater, et al. High Voltage Silicon VMJ Solar Cells for up to 1000 Suns Intensities. Photovoltaic Specialists Conference 2002. Conference Record of the Twenty-Ninth IEEE, May 19-24, 2002, pp. 1019-1022. Last accessed Oct. 1, 2009, 4 pages.

Australian Office Action mailed Oct. 18, 2011 for AU Application No. 2009266870, 3 pages.

OA mailed Oct. 17, 2011 for U.S. Appl. No. 12/495,164, 16 pages.

The Fredericks Company. "Electrolytic Tilt Sensor Selection and Operation" published on the Internet at [http://www.fredericks.com/sens_tech_select.tpl], retrieved Oct. 8, 2011, 3 pages.

The Fredericks Company. "TrueTILT Wide Range" published on the Internet at [http://www.frederickscom.com/sens_tilt_0717_4304.tpl], retrieved Oct. 8, 2011, 1 page.

The Fredericks Company, "0717-4304-99 TrueTilt, Dual Axis, Wide Angle, Electrolytic Tilt Sensor" published on the Internet at [http://www.frederickscom.com/pdf/0717-4304.pdf], retrieved Oct. 8, 2011, 2 pages.

OA dated Nov. 21, 2011 for U.S. Appl. No. 12/495,398, 30 pages.

OA dated Nov. 14, 2011 for U.S. Appl. No. 12/496,150, 36 pages.

OA dated Nov. 4, 2011 for U.S. Appl. No. 12/496,541, 48 pages.

Notice of allowance dated Mar. 23, 2012 for U.S. Appl. No. 12/495,164, 36 pages.

Final Office Action dated Apr. 16, 2012 for U.S. Appl. No. 12/495,398, 36 pages.

Non-Final Office Action dated Mar. 30, 2012 for U.S. Appl. No. 12/495,136, 41 pages.

Final Office Action dated Mar. 1, 2012 for U.S. Appl. No. 12/496,541, 31 pages.

* cited by examiner

POLAR MOUNTING ARRANGEMENT FOR A SOLAR CONCENTRATOR

CROSS-REFERENCE TO RELATED APPLICATIONS

This application claims the benefit of U.S. Provisional Application Ser. No. 61/078,256, filed Jul. 3, 2008, entitled "POLAR MOUNTING ARRANGEMENT FOR A SOLAR CONCENTRATOR", and assigned to the assignee hereof, which is incorporated herein by reference.

TECHNICAL FIELD

The subject specification relates generally to solar power and in particular a polar mounting arrangement for positioning of a solar concentrator.

BACKGROUND

Limited supply of fossil energy resources and associated global environmental damage have compelled market forces to diversify energy resources and related technologies. One such resource that has received some attention is solar energy, which employs photovoltaic technology to convert light into electricity. Solar technology is typically implemented in a series of solar (photovoltaic) cells or panels of cells that receive sunlight and convert the sunlight into electricity, which can be subsequently fed into a power grid. Significant progress has been achieved in design and production of solar panels, which has effectively increased efficiency while reducing manufacturing cost thereof. As more highly efficient solar cells are developed, size of the cell is decreasing leading to an increase in the practicality of employing solar panels to provide a competitive renewable energy substitute. To this end, solar energy collection systems can be deployed to feed solar energy into power grids.

Typically, a solar energy collection system includes an array of solar panels arranged in rows and mounted on a support structure. Such solar panels can be oriented to optimize the solar panel energy output to suit the particular solar energy collection system design requirements. Solar panels can be mounted on a fixed structure, with a fixed orientation and fixed tilt, or can be mounted on a moving structure to aim the solar panels toward the sun as properly orienting the panels to receive the maximum solar radiation will yield increased production of energy.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventional methods of mounting a solar array in a solar collection system involve having the array mounted offset from a supporting structure. However, during tracking of the sun by the array, larger capacity motors can be used to overcome the effects of the displaced center-of-gravity of the array, decreasing the efficiency of the system.

With the disclosed subject matter, an array is disclosed such that the array is mounted in a plane of a supporting structure allowing the center-of-gravity of the array about the axis of the supporting structure to be maintained. In comparison with conventional systems, smaller motors can be utilized to position the array as the effects of a displaced center-of-gravity are minimized. Further, the array can be rotated about the supporting structure allowing the array to be placed in a safety position to prevent damage of the components that comprise the array, e.g., photovoltaic cells, mirrors, etc. The array can also be positioned to facilitate ease of maintenance and installation.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
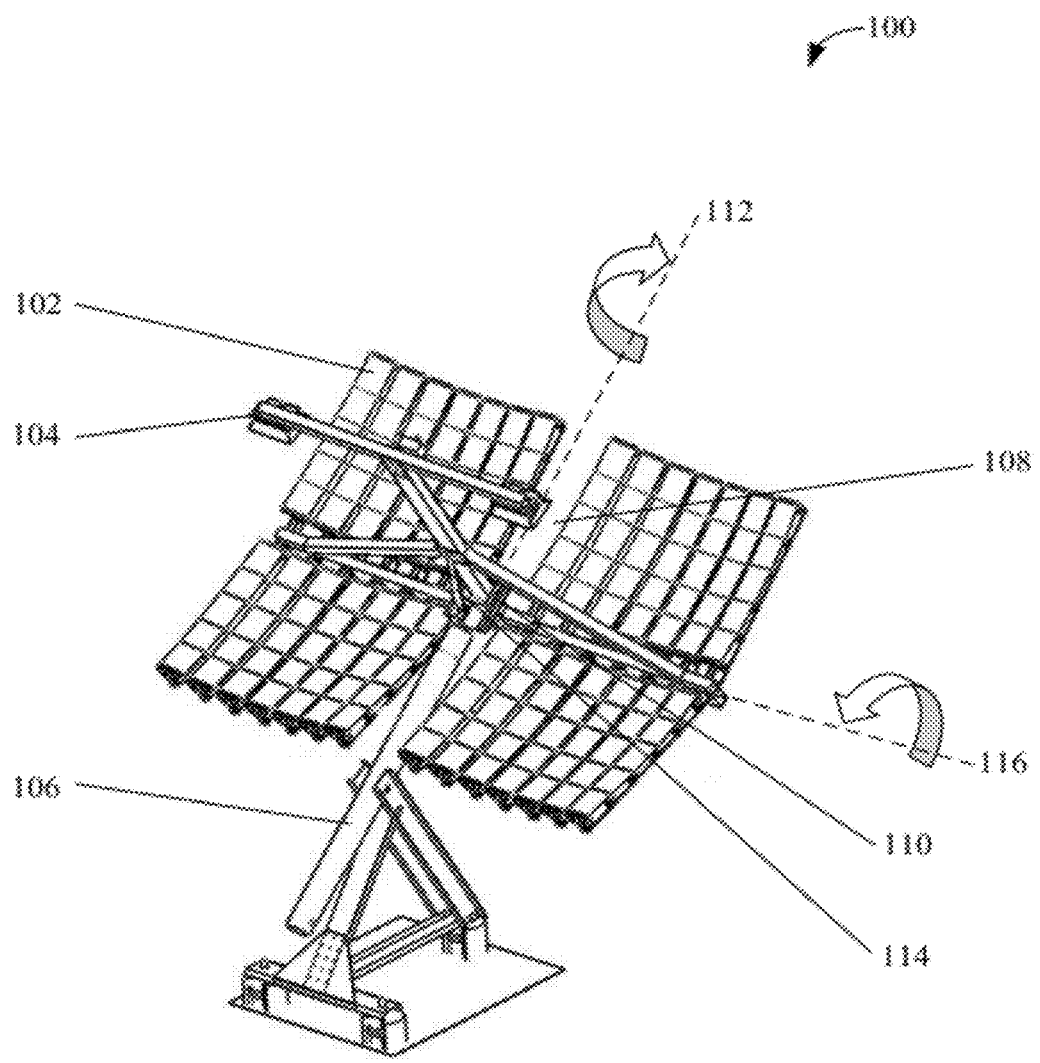
FIG. 1 illustrates a representative configuration of an energy collector aligned with an energy source in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. It is to be appreciated that determinations or inferences referenced throughout the subject specification can be practiced through use of artificial intelligence techniques.

To improve the efficiency of a solar array and it's ability to capture the suns rays and turn the energy contained in the rays from solar energy to electrical energy, it is important to have the solar array optimally aligned to the sun. In the case of where the solar array is comprised of photovoltaic elements, the photovoltaic elements should be aligned optimally, e.g., perpendicular, to operate at their peak efficiency. Similarly, when incorporated in to a solar concentrator system, the array can comprise of a mirror(s), which reflects and focuses the solar radiation for collection by a solar collector.

Turning to the figures, FIG. 1 illustrates a solar energy collection system 100 comprising of an array 102 aligned to reflect the suns rays on to a central collection apparatus 104. To facilitate harnessing energy from the suns rays the array 102 can be rotated in various planes to correctly align the array 102 with respect to the direction of the sun, reflecting the sun rays on to the collector 104. The array 102 can comprise of a plurality of mirrors, which can be used to concentrate and focus the solar radiation on the collector 104, where the collector can comprise of photovoltaic cells facilitating the conversion of solar energy in to electrical energy. The array 102 and the collector 104 can be supported on polar mount support arm 106. Further, the mirrors have been arranged so that a gap, 108, separates the array of mirrors 102 in to two groups. A motorized gear assembly 110 connects the array 102 and the collector 104 to a polar mount support arm 106. The polar mount support arm 106, is aligned to the earth's surface such that it is aligned parallel with the tilt of the earth's axis of rotation, as discussed supra. The motorized gear assembly 110 allows the array 102, and collector 104, to be rotated about the horizontal axis 112, the horizontal axis is also known as the ascension axis. The array 102, and collector 104, are further connected to the polar support 106, by an actuator 114. The actuator 114 facilitates the array 102, and collector 104, to be rotated about the vertical axis 116, the vertical axis is also known as the declination axis.

Figure 2:
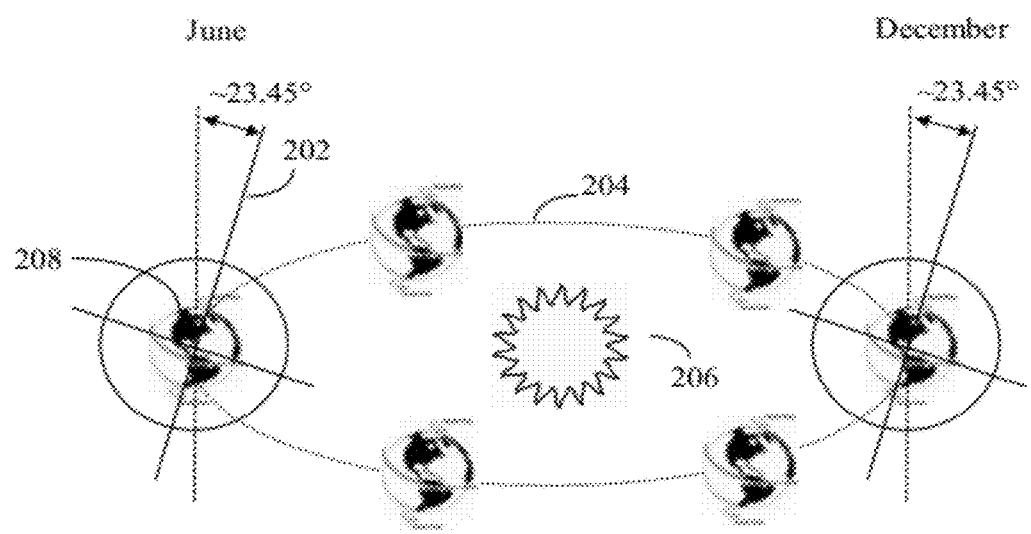
FIG. 2 illustrates the change in position of the sun with respect to the earth in accordance with an aspect of the subject specification.
Figure 3:
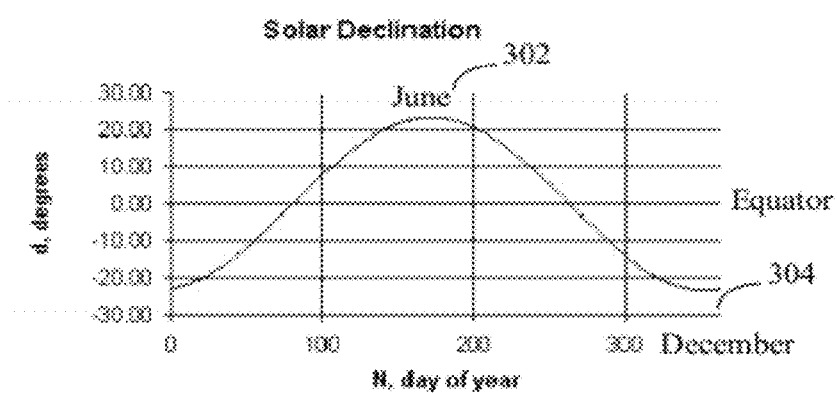
FIG. 3 illustrates the variation in declination angle of the sun with respect to the earth throughout the year in accordance with an aspect of the subject specification.

The efficiency of a solar array can be improved by enabling the solar array to be aligned to the sun to increase the amount of sun rays being collected by the array. Over the course of the year the position of the sun relative to the position of a solar array, where the solar array is in at fixed location on the earth, varies in both the horizontal (ascension) axis 112 and the vertical (declination) axis 116. During the day the sun rises in the east and sets in the west, the movement of the sun across the sky is known as the ascension and the position/angle of the solar array 102 relative to the position of the sun needs to be such that the solar array 102 is aligned to the position of the sun. Further, throughout the year the sun also changes its position relative to the earth's equator. As shown in FIG. 2, the tilt of the earth's axis, 202, in relation to the earth's orbital path, 204, about the sun, 206, is approximately 23.45 degrees. During the completion of one rotation about the sun, 206, by the earth, 208, which takes approximately one year to complete, the position of the sun, 206, relative to the earth's equator varies by about ±23.45 degrees. FIG. 3, relates the variation in the path of the sun in relation to the earth's equator, throughout the year; with the sun being at it's highest position relative to the equator in June 302, and at it's lowest position relative to the equator in December 304. To correctly position an array such that it is aligned to the sun in the vertical axis, means should be provided to allow the solar array to sweep through an angle of about 47 degrees ((23.45 degrees above the horizon)+(23.45 degrees below the horizon)), the declination angle. Referring back to FIG. 1, the gap 108 in the collection panels allows the array 102 to be tilted through the required declination by the actuator 114, without the array 102 being obstructed by the supporting arm of the polar mount 106. The gap 108 in the panels also allows the array to rotated about the ascension axis 112, which runs parallel to the direction of the supporting arm of the polar mount 106, without the panels which comprise the array 102 being obstructed by the supporting arm of the polar mount 106.

In the case of where the solar radiation is being focused on a central collector by a mirrored array the efficiency of the collector can be maximized by ensuring that the reflected sun light falls evenly across the components that form the central collector. For example, the central collector can be comprised of a group of photovoltaic cells. In some configurations the photovoltaic cells can be sensitive to variations in sun light intensity across the group of photovoltaic cells, it can be beneficial to ensure that each photovoltaic cell receives the same amount of solar radiation; use of a polar mount and positioning apparatus, as related in the disclosed subject matter, can be utilized to ensure this is the case.

While, throughout the discussion of the matter, the focus has been upon the collection of rays from the sun and reflecting them to a central collector that facilitates the conversion of the energy contained in the suns rays to electrical energy, this is used for explanation purposes and is not intended to limit the scope of the claims. The claimed subject matter can be used to facilitate the collection of energy from a multitude of energy sources that involve energy radiation, such energy sources include x-rays, laser, alpha-rays, beta-rays, gamma-rays, all electromagnetic radiation sources that can be found in the electromagnetic spectrum, etc.

Figure 4:
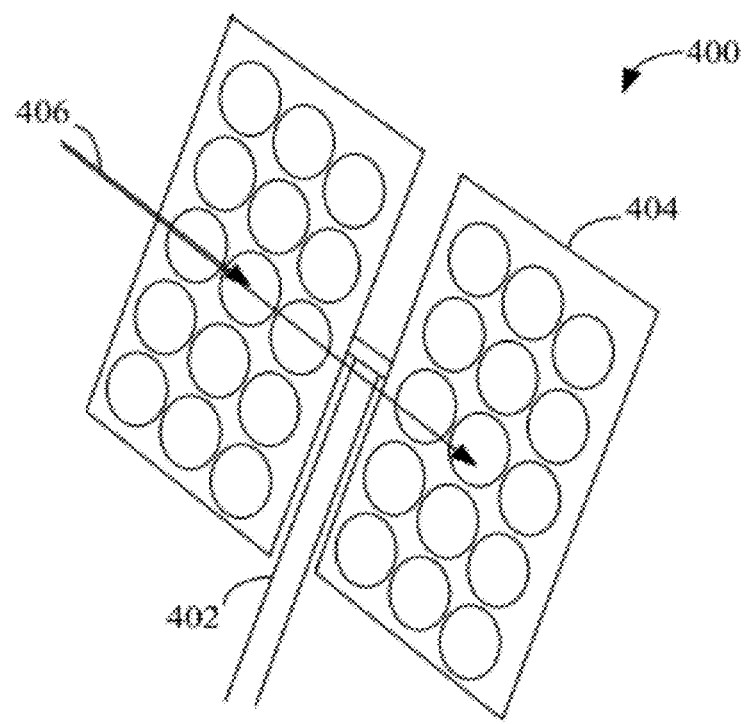
FIG. 4 illustrates a solar array in accordance with an aspect of the subject specification.
Figure 5:
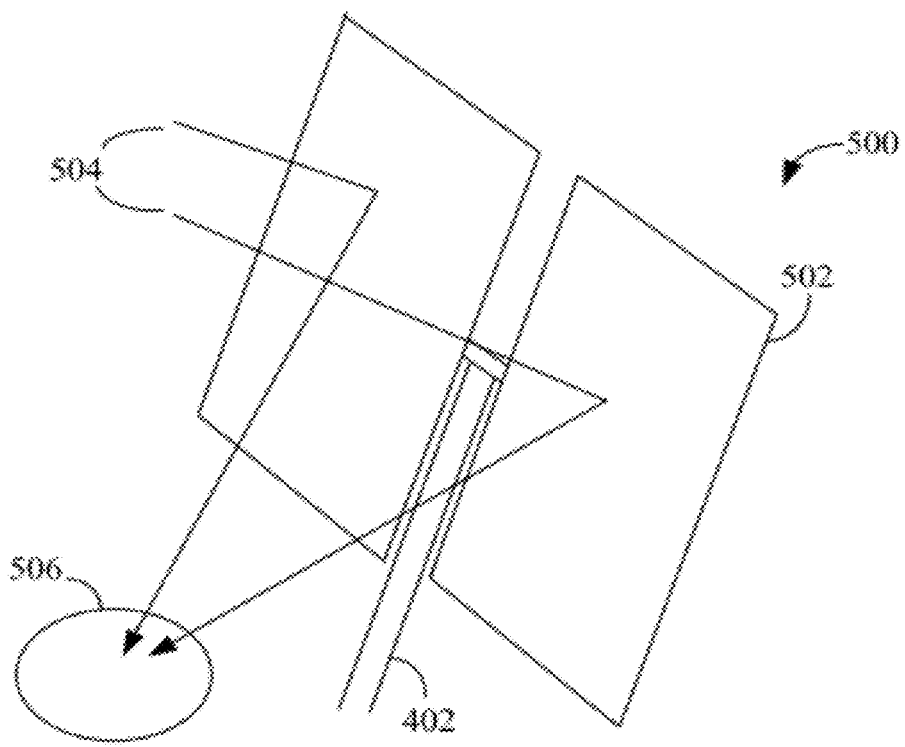
FIG. 5 illustrates a solar array in accordance with an aspect of the subject specification.

It is to be appreciated that while the example system 100, as shown in FIG. 1, comprises of an array of mirrors utilized to focus sunlight on a central collector the subject disclosure is not so limited and can be used to provide positioning of a variety of collection devices. For example, as depicted by FIG. 4, system 400, in one embodiment, a polar mount 402 comprising of a polar mount support arm and means to provision alignment about the angles of ascension and declination of the support arm, could be used to locate an array of solar cells/photovoltaic devices 404, where the polar mount is used to maintain the array in alignment to the suns rays 406. As related in FIG. 5, system 500, in another embodiment the polar mount 402 can support an array of mirrors 502 that are used to reflect sunlight 504 to a remote collection device 506.

Figure 6:
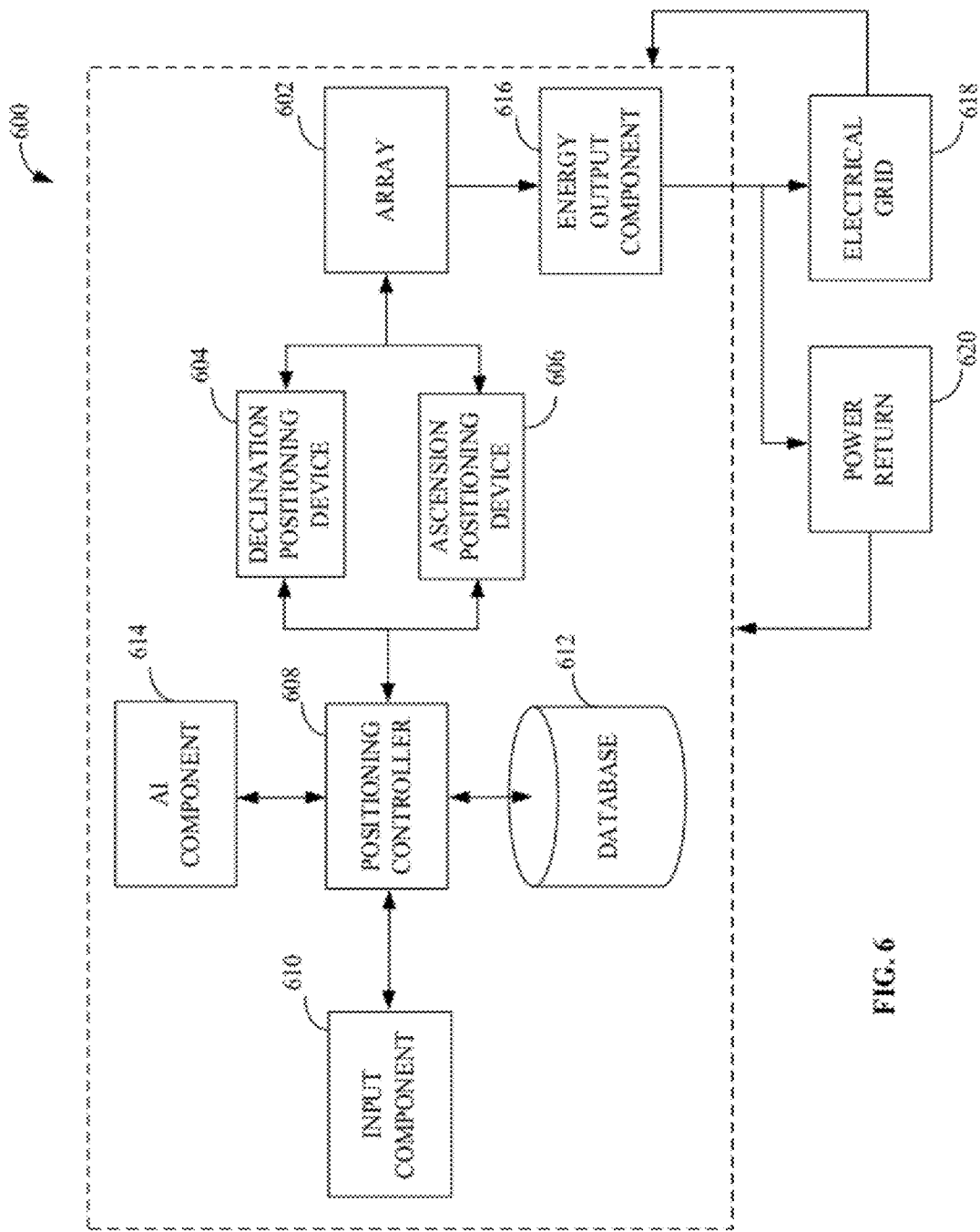
FIG. 6 illustrates a representative system in which the solar array can be incorporated in accordance with an aspect of the subject specification.

Turning to FIG. 6, system 600 relates a more detailed system for collection of solar energy into which the claimed subject matter can be incorporated. A solar array 602 is aligned in relation to the sun via the use of a declination positioning device 604 and an ascension positioning device 606, the operation of the positioning devices, 604 and 606, to align the collector is as discussed supra. The positioning devices, 604 and 606, are controlled by a positioning controller 608, which provides instructions to the positioning devices, 604 and 606, regarding their respective positions and also receives feedback from the positioning devices to allow the positioning controller 608 to determine anticipated instructions and location of the array 602. An input component 610 can also be incorporated to facilitate interaction with the positioning controller 608, and subsequently control the position of the array 602, by a user or mechanical/electronic means. The input component 610 can represent a number of devices that can facilitate transfer of data, instructions, feedback, and the like, between the position controller 608 and a user, remote computer, or the like. Such input component devices 610 can include a global positioning system that can provide latitude and longitude measurements to allow the array 602 to be positioned and controlled based upon location of the array 602. Further, the input device 610 could be a graphical user interface (GUI) that allows a user to enter instructions and commands to be used to control the position of the array 602, e.g., an engineer enters commands during the installation process to test the operation of the positioning devices 604 and 606. The GUI can also be utilized to relay position measurements, operating conditions or the like, from the positioning controller 608 describing the current position and operation of the array 602. For example, during installation an engineer can review the position feedback displayed on the GUI and compare it with anticipated values. The positioning controller 608 can also be operated remotely from the locality of the array 602 through the use of remote networks such as a local area network (LAN), wide area network (WAN), internet, etc., where the networks can be either hardwired to the input component 610 or wirelessly connected.

A database and storage component 612 can also be associated with the system 400. The database can be used to store information to be used to assist in the positional control of the array 602 by the positioning controller 608, such information can include longitudinal information, latitudinal information, date and time information, etc. The positioning controller 608 can include means, e.g., a processor, for processing data, algorithms, commands, etc., where, for example, such processing can be in response to commands received from a user via the input component 610. The positioning controller 608 can also have programs and algorithms running therein to facilitate automatic positional control of the array 602 where the programs and algorithms can use data retrieved from the database 612, with such data including longitudinal information, latitudinal information, date and time information, etc.

An artificial intelligence (AI) component 614 can also be included in system 600 to perform at least one determination or at least one inference in accordance with at least one aspect disclosed herein. The artificial intelligence (AI) component 614 can be used to assist the positioning controller 608 in positioning the array 602. For example, the AI component 614 could be monitoring weather information being received at the position controller 608 via the internet 610. The AI component 614 could determine that local weather conditions are potentially reaching a point of concern with regard to safe operation of the array 602 and the array 602 needs to be closed down until the weather system has passed. The AI component 614 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the AI component 614 can also include methods for capture of logical relationships such as theorem provers or more heuristic rule-based expert systems. The AI component 614 can be represented as an externally pluggable component, in some cases designed by a disparate (third) party.

System 600 can further include an energy output component 616 which can be utilized to convert the solar energy collected at the array 602 to electrical energy. The energy produced by the output component 616 can be fed in to the electrical grid 618 as well as into a power return 620. However, the power return 620 facilitates the use of power generated by the system 600 to be used to power the system 600. For example, some of the power generated by the output component 616 can be fed back in to the system 600 to provide power for the various components that comprise system 600, such as to power the positioning devices 604 and 606, the positioning controller 608, the AI component 614, the input component(s) 610, etc. However, while such a self-contained system could be considered a worthy goal for fail-safe concerns etc., means can also be provided to allow system 600, and its components, to draw power from the electrical grid 618. For example, when operating in a closed-loop mode there may be insufficient energy being produced by the array to fulfill the energy operating requirements of the system 600, and energy can be drawn from the electrical grid 618 to compensate for the energy deficiency.

Figure 7:
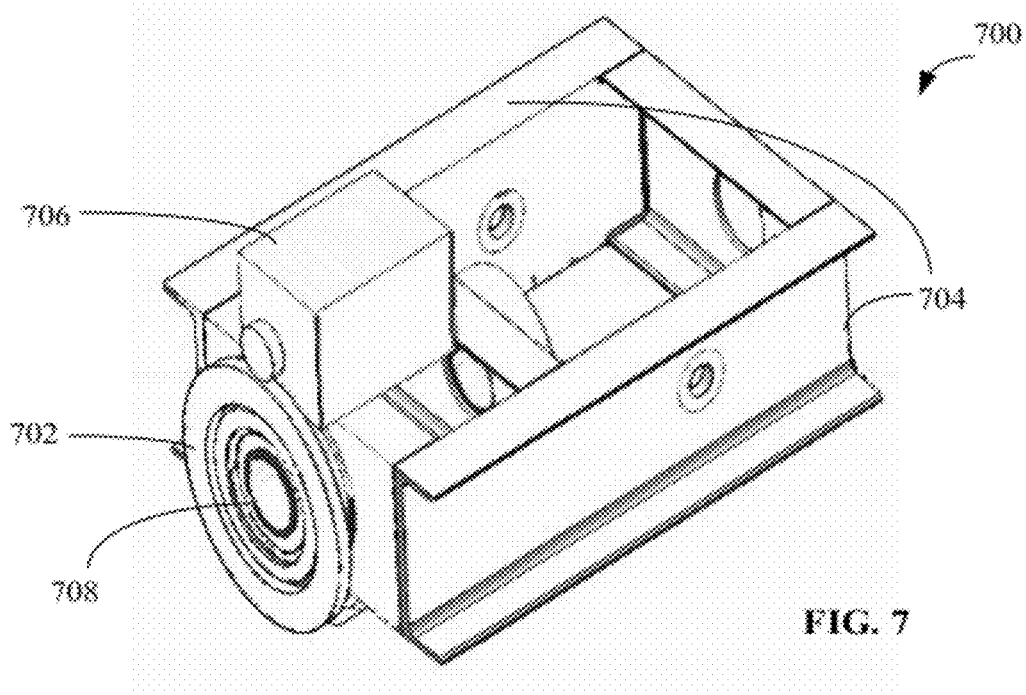
FIG. 7 illustrates an assembly for connecting and aligning a polar mount a solar array in accordance with an aspect of the subject specification.

Referring to FIG. 7, system 700 relates an assembly, which can be used to connect a solar array (e.g., such as solar array 102 of FIG. 1) to a polar mount support arm (e.g., such as polar mount support arm 106 of FIG. 1). System 700 can also be used to rotate the array about the central axis of the polar mount support arm, which provides ascension positioning of the array. System 700 comprises of a connector 702, which can be used to connect the polar mount support arm to the assembly 700, the solar array connects to the assembly 700 by attachment to the support brackets 704. A motor 706 in combination with gearing 708 facilitates the rotation of the array about the polar mount support arm, where the assembly remains fixed at the connector 702 and the support brackets 704 and attached array rotates about the polar mount support arm.

Figure 8:
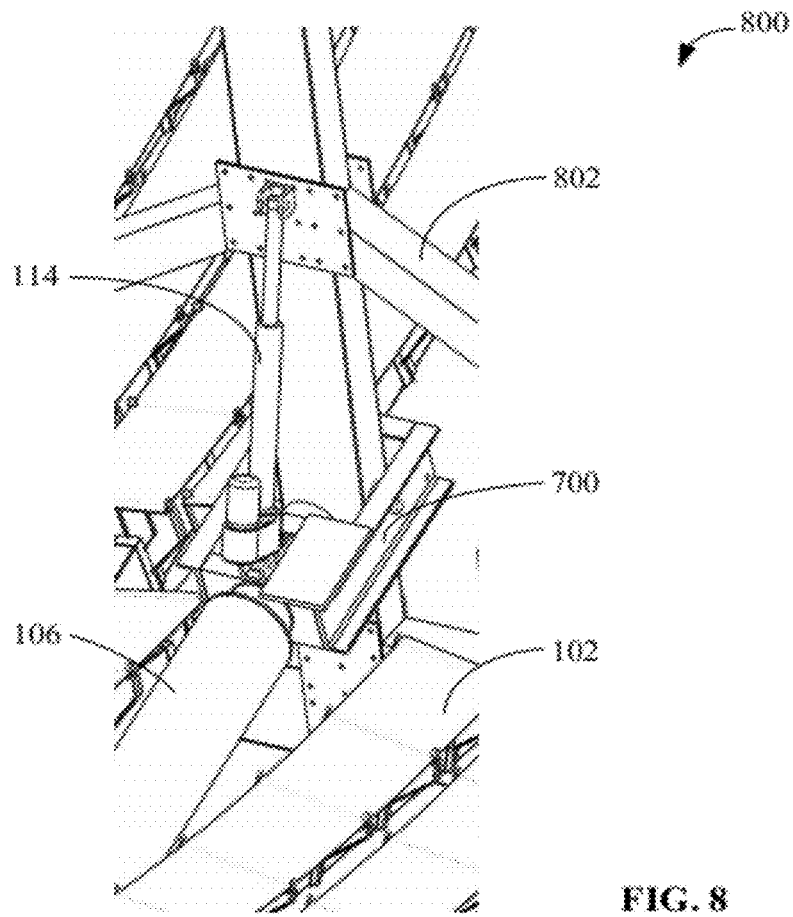
FIG. 8 illustrates an assembly to facilitate tilting of a solar array in accordance with an aspect of the subject specification.

Turning to FIG. 8, system 800, illustrates an apparatus to tilt a solar array 102 through a declination axis in relation to a polar mount support arm 106. System 800 comprises of a positioning device 114, e.g., an actuator, which is connected to a positioning assembly 700. The positioning assembly 700, as discussed supra, facilitates rotating the solar array 102 about the ascension axis of the polar mount support arm 106. The positioning device 114 can tilt the array 102 to the required angle of declination with respect to the sun's position in the sky, as the positioning device 114 moves in relation to the positioning assembly 700, the support 802 to which the positioning device 114 is connected, also moves causing the array 102 to tilt through a range of declination angles. As the positioning assembly 700 is rotated to track the ascension of the sun the positioning device 114 can be used to ensure that that the array 102 remains at the angle of declination to capture the suns rays. Use of a positioning device 114 in conjunction with the polar mount allows the array to be adjusted to the required declination angle at the commencement of solar collection as opposed to continually having to adjust the angle of tilt throughout the sun tracking process, reducing the energy consumption of the system as the actuator only has to be adjusted once per day as opposed to continually. While the actuator can adjust the declination angle of the array once per day the claimed subject matter is not so limited with the actuator adjusting the declination as many times per day as is required to provide tracking of the sun.

Referring to FIGS. 7 and 8, while the actuator 114 and motor 706 are shown as two separate components, alternative embodiments can exist where the actuator 114 and motor 706 are combined in a single assembly that provides connection of an array 102 to the polar mount support arm 106 while facilitating the alteration of the position of the array 102 with respect to ascension and declination in relation to the position of the sun or similar energy source from which energy is to be captured. In other embodiments of the subject matter, various combinations of motors and actuators can be utilized to provide positioning of collection arrays and devices utilized to harness the capture of radiation etc. while facilitating the adjustment of the position of the arrays and devices in relation to the energy source.

A variety of means to provide ascension/declination positioning of the array can be implemented into the system. Example means can include mechanical, electrical, electromagnetic, magnetic, pneumatic, and the like.

One embodiment of the subject innovation is the use of DC brushless motors, taking advantage of their low cost and low maintenance. In a further embodiment DC brushless stepper motors can be used, where the number of steps during operation of a motor is counted to provide highly accurate positioning of the array. For example, in one configuration it is known that there are 10 steps/1 degree of rotation, the position of the array can be adjusted in about 0.1 degree increments to track the passage of the sun through the sky.

Figure 9:
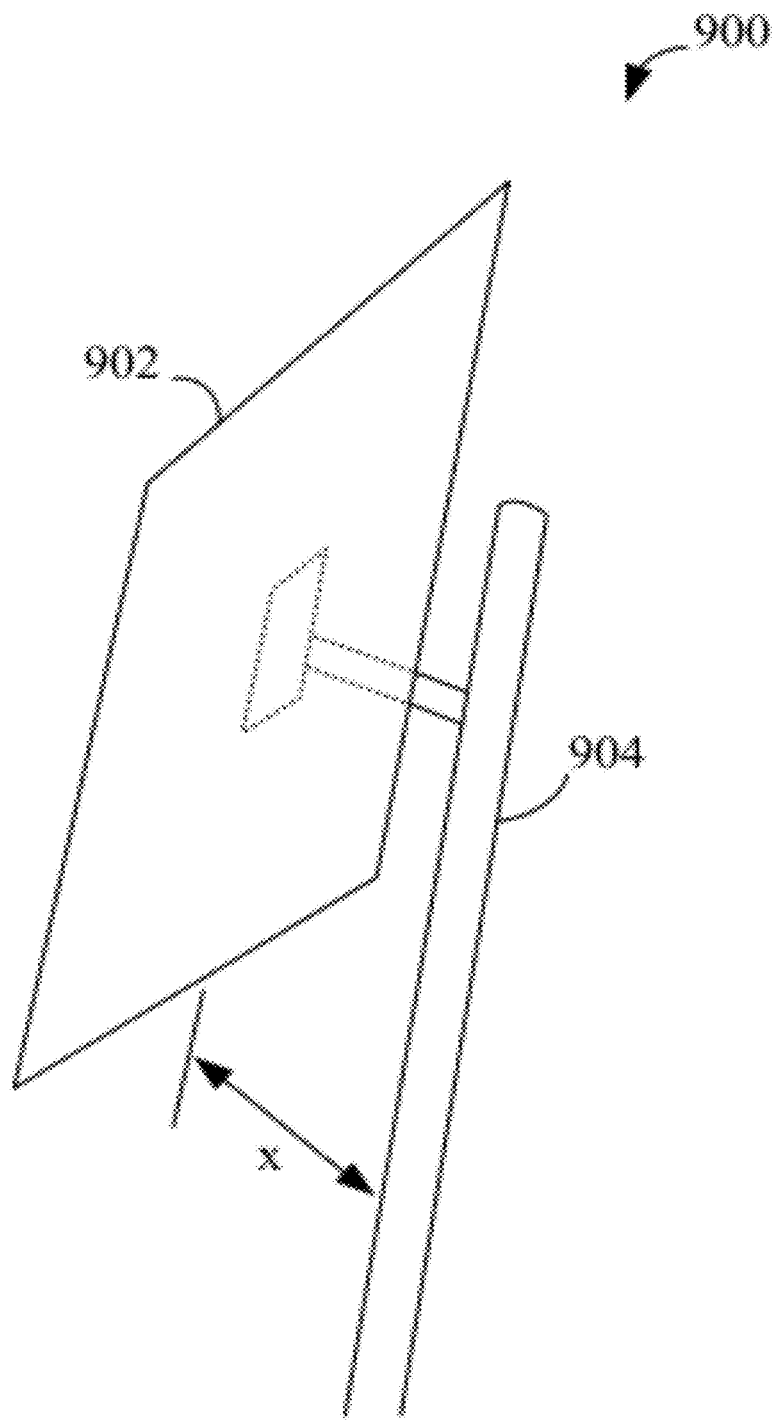
FIG. 9 illustrates a prior-art system showing the displaced center-of-gravity of an array with respect to a support in accordance with an aspect of the subject specification.

Turning to FIG. 9, in conventional polar mount systems, for example as utilized with photovoltaic arrays, the array 902 is supported off-axis in relation to the support arm 904. Depending upon such factors as the size and weight of the components which comprise the array 902 and associated devices (not shown) the center of gravity is displaced in relation to the support arm 904, with the center of gravity being located anywhere along dimension x. In such a system, energy is wasted during the movement of the array as it tracks the sun, as the out of balance resulting from the displaced center of gravity has to be compensated for and overcome.

With reference to FIG. 1, in one embodiment of the subject innovation the gap 108 in the array negates the array 102 having to be offset from the polar mount supporting arm 106, with the array 102 being attached to the polar mount supporting arm 106 in the plane of the polar mount supporting arm. Such an arrangement allows the array 102 to be balanced about the axis of the polar mount supporting arm 112. In comparison with a conventional polar mount system (system 900), the energy required to rotate the array 102 about the ascension axis 112 is reduced, the reduced energy requirements can facilitate the use of smaller capacity motors in the mounting and positioning assembly, as discussed with reference to FIG. 7, leading to reduced system costs.

If the array is to be placed in a position for storage, safety, or for maintenance purposes, as discussed infra, the motor can be stepped through the required number of steps to move the array from it's current position to it's storage or safety position. Further to this example, the number of steps required to move the array in a clockwise direction from it's current position to the storage position can be determined, along with the requisite number of steps in the anti-clockwise direction, the two counts can be compared and the shortest direction is used to placed the array in the storage position.

In another embodiment, in response to potentially damaging weather conditions, e.g., a passing hailstorm, the array can be placed in a safety position. A record of the number of steps required to move the array to the safety position from the current position of the array, prior to the command to move to the safety position being received, can be determined. After the hailstorm has passed the array can be repositioned to resume operation where the repositioning is determined based upon the last known position of the array plus the number of steps required to compensate for the current position of the sun, e.g., last position of array prior to the hailstorm+number of steps to move the array to current position of the sun. The current position of the sun can be determined by the use of latitude, longitude, date, time information associated with the array and the position of the array. The current position of the sun can also be determined by the use of sun position sensors, which can be used to determine the angle at which the energy of sunlight is strongest and position the array accordingly.

Figure 10:
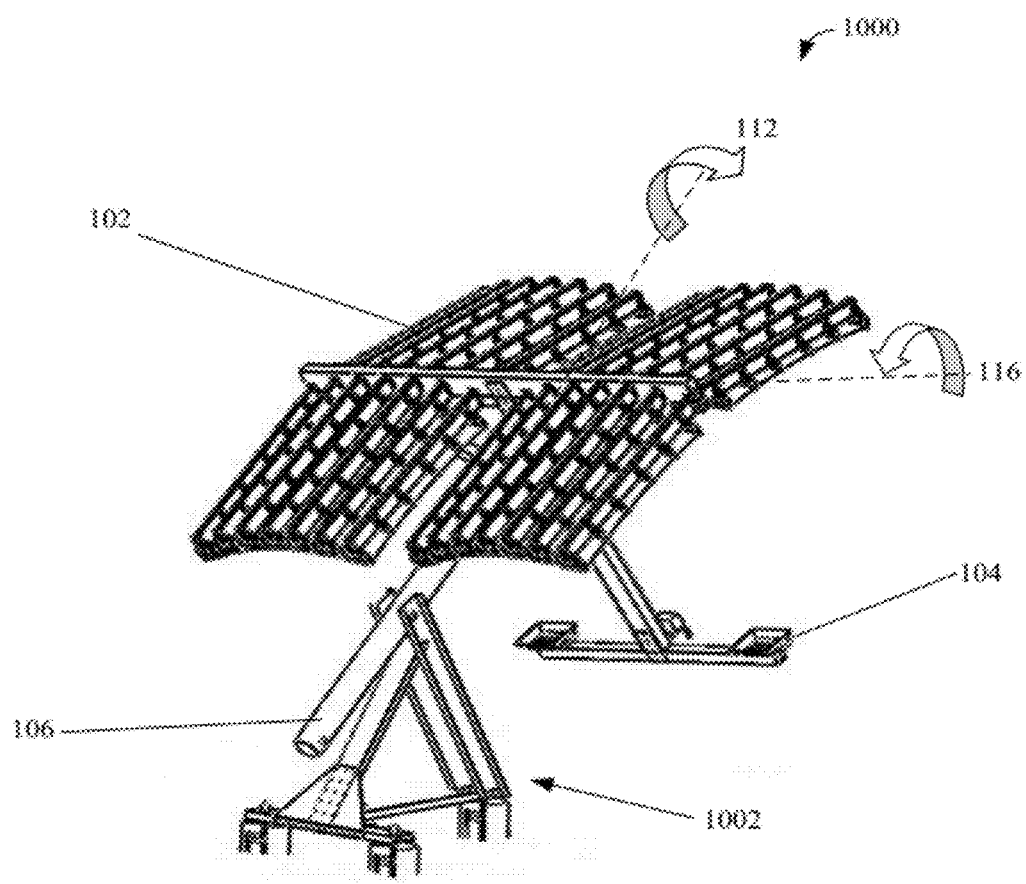
FIG. 10 illustrates a solar array in a safety position in accordance with an aspect of the subject specification.

Further, the gap 108 in the collection panels allows the panels to be positioned to minimize susceptibility of the mirrors, that form the array, to environmental damage such as strong winds and hail strikes. As depicted in FIG. 10, the array 102 can be rotated about the polar supporting arm 106, to place the array in a "safety position". The ability to rotate the array 102 about the ascension axis 116 and tilt about the declination axis 112 allows the array 102 to be positioned so that its alignment with any prevailing wind minimizes a sail effect of the solar array 102 in the wind. Also, in the event of hail strikes, snow, etc, the array 102 can be positioned such that the mirrors are facing downwards with the backside of the array structure being exposed to the hail strikes, mitigating damage to the mirrors.

Furthermore, in another embodiment of the claimed subject matter, rotation of the array 102 about the ascension axis 116 and the declination axis 112 can enable all areas of the array to be brought within easy reach of an operator. The operator could be an installation engineer who needs access to the various mirrors 102, collector 104, etc., during the installation process. For example, the installation engineer may need to access the central collector 104 for alignment purposes. The operator could also be a maintenance engineer who requires access to the array 102 to clean the mirrors, replace a mirror, etc. FIG. 10 depicts an example embodiment of the polar supporting arm 106 located on a base support 1002. The base support 1002 can comprise of various footers, support structure, foundation structure, mounting brackets, positioning motors, and the like, as required to facilitate support, location and placement of the polar supporting arm 106 and other arrays components, e.g., array 102, collector 104, etc. As depicted in FIG. 10, to facilitate access to the various components of solar energy collection system 100, e.g., the array 102, collector 104, etc., the polar supporting arm 106 can be selectively disengaged (at least partially) from the base support 1002 enabling the solar energy collection system 100 to be tilted and lowered as required.

Figure 11:
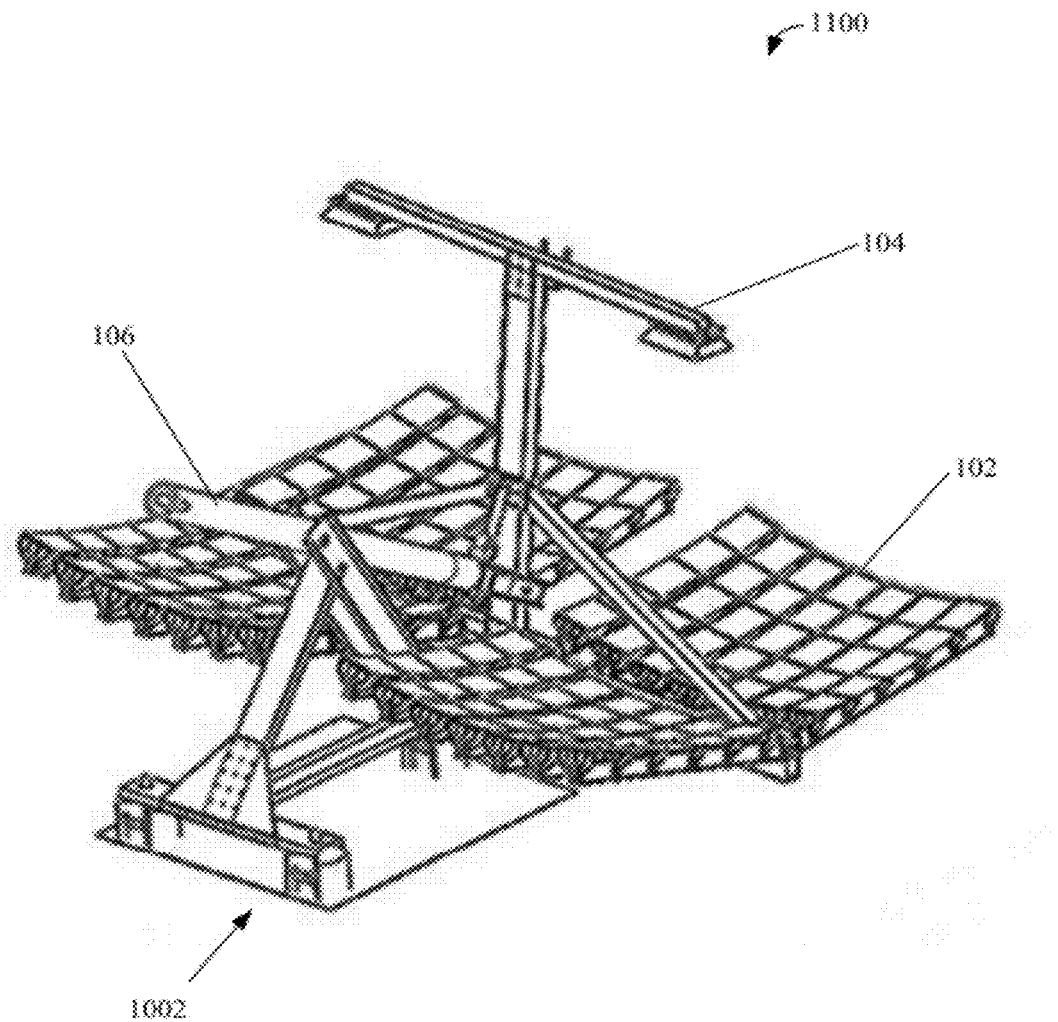
FIG. 11 illustrates a solar array in a position for safety, maintenance, installation, etc., in accordance with an aspect of the subject specification.

As described above, the polar supporting arm 106 can also be selectively disengaged (at least partially) from a supporting structure (e.g., base support 1002) to facilitate positioning the solar energy collection system 100 as required, e.g., a "safety position", maintenance, installation, alignment tuning, storage, etc. FIG. 11 illustrates a schematic representation 1100 of a solar energy collection system 100 in a lowest position, which can be a position of safety, maintenance, installation, alignment tuning, storage, and the like.

Figure 12:
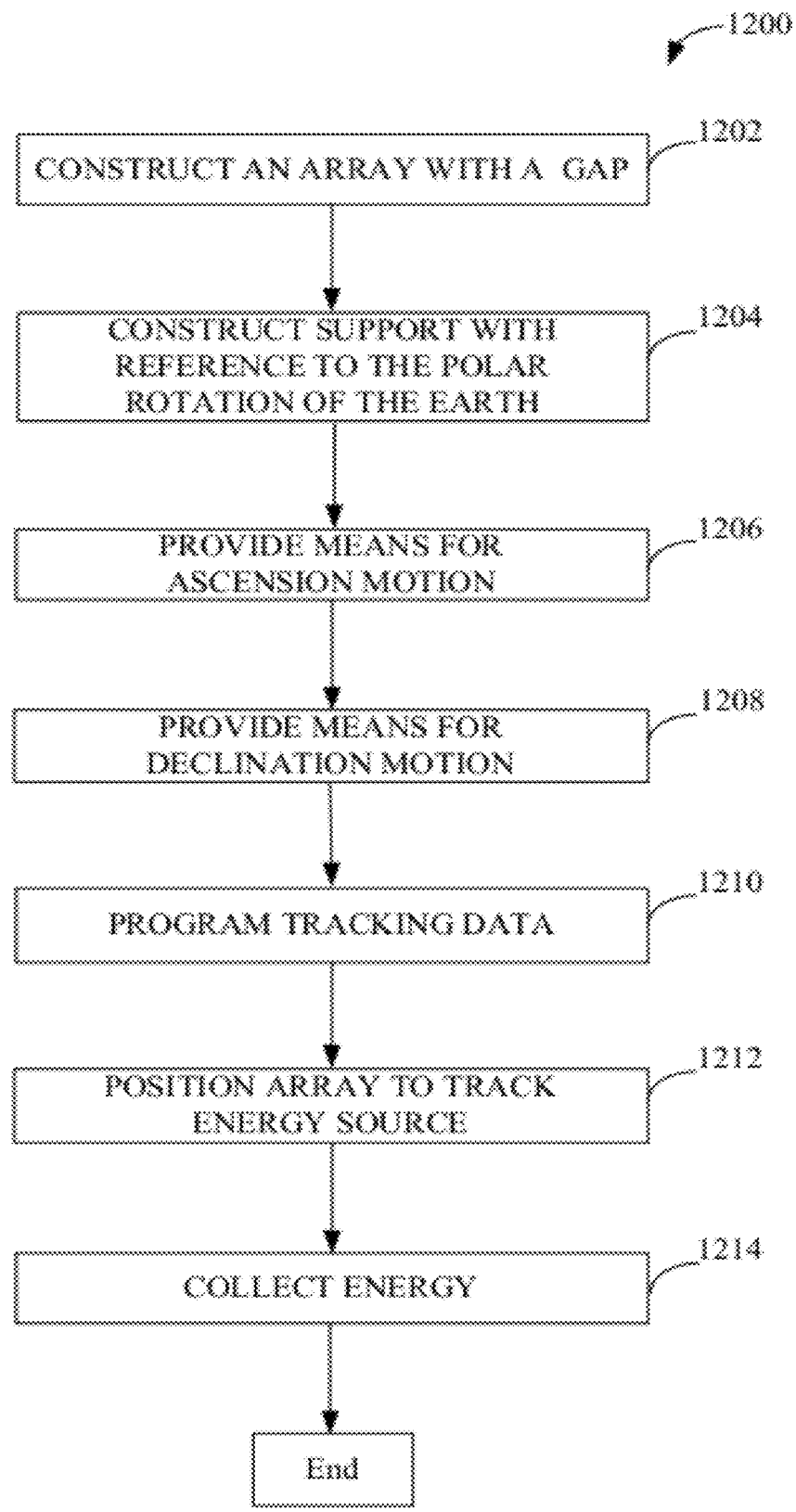
FIG. 12 illustrates a representative methodology for constructing, mounting and positioning a solar array in accordance with an aspect of the subject specification.

FIG. 12 shows a methodology 1200 for constructing a solar array and positioning the array to track the sun. At 1202, a solar array is constructed where the array comprises of two planar sections of equal size. The array can be constructed from mirrors to facilitate reflection of solar rays to a central collector or, in an alternative embodiment, the array can comprise an array of photovoltaic devices to absorb the solar energy and provision the conversion of solar energy to electrical energy. The two arrays are connected by a central support, with the arrays placed on the support such that a gap is left between the arrays, the gap is of a known width in accordance with act 1204.

At 1204, a polar mount is constructed where the polar mount is positioned on the earth's surface such that it is aligned parallel with the tilt of the earth's axis of rotation. Returning to act 1202, the gap left between the two arrays is of sufficient width to allow the arrays to be located at the end of the polar mount, such that the arrays are positioned either side of the polar mount.

At 1206, means are provided to allow the array to be rotated about the polar mount along the angle of ascension. Such means can include a motor, actuator, or similar device and the means can form part of the connector that connects the arrays to the polar mount. At 1208, means are provided to allow the array to be tilted through a range of angles with respect to the polar mount along the angle of declination, where the range of angles includes the required degree of angle to keep the array in alignment with the sun and it's variation of declination as well as a greater range of angles to allow the array to be tilted for installation, maintenance, storage, etc. Such means can include a motor, actuator, or similar device. The means can form part of the connector that connects the arrays to the polar mount.

At 1210, information is provided to the system to allow the array to track the sun as the sun traverses the sky. Such information can include longitude data, latitude data, date and time information, etc., based upon the location of the array. Using the information provided in 1210, at 1212 the array is aligned with respect to the sun to facilitate generation of energy from solar energy. The array is aligned to the sun by altering the angles of declination and ascension of the array with respect to the sun. In one embodiment the angle of ascension can be altered throughout the day while the angle of declination is adjusted once in accordance with the height of the sun in the sky. In an alternative embodiment the angles of ascension and declination can be adjusted as required, e.g., continually, to maintain the array in alignment with the sun.

At 1214, the solar array facilitates collection of energy from the sun whether it be by photovoltaic, reflected, or similar means.

Figure 13:
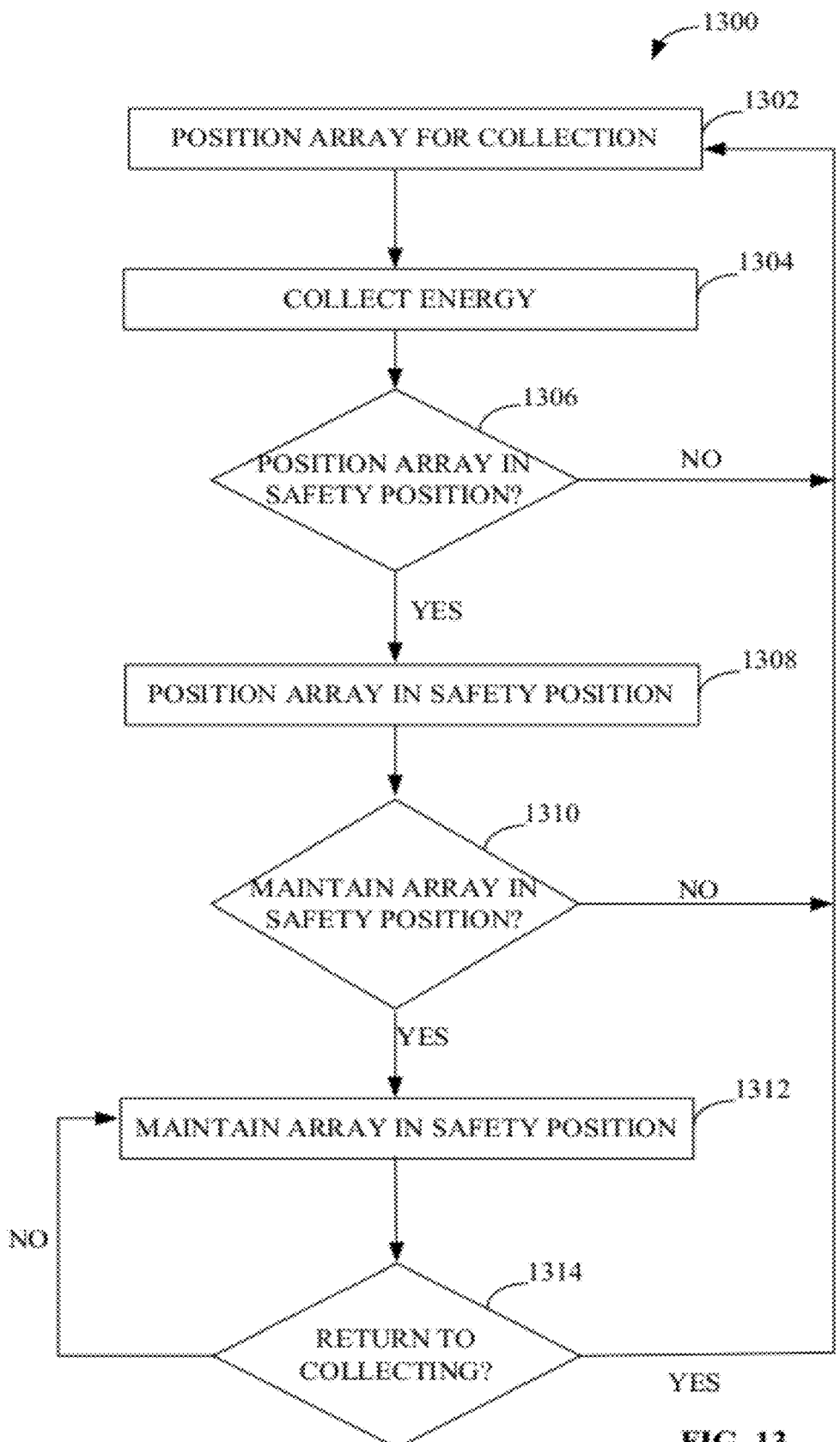
FIG. 13 illustrates a representative methodology for positioning a solar array in a safety position in accordance with an aspect of the subject specification.

FIG. 13 relates a methodology 1300 to facilitate placement of a solar array in a position of safety (e.g., to prevent damage to the array and associated components due to weather conditions), maintenance (e.g., the array needs to be inspected, cleaned, replaced, etc.), installation (e.g., the array is moved through a variety of positions to determine that any positioning devices are functioning correctly), or the like.

At 1302, the solar array is positioned in the normal operating position to collect the suns rays with the angles of ascension and declination of the array with respect to the sun being adjusted throughout the day to maintain the array in alignment with the sun; the array facilitates collection of energy from the solar rays, 1304.

At 1306, a determination is made as to whether the array is to be placed in a safety position, e.g., in response to information being received that a weather system is moving into the area. If the weather system is deemed to not pose a threat to the operation of the array the method 1300 returns to 1302 and solar energy continues to be collected. If it is determined that the solar array needs to be shut down and placed in a safety position, e.g., a hail storm is approaching which could damage the mirrors/photovoltaics, a command can be placed to position the array in the safety position, 1308.

While the array is in the safety position, at 1310, a determination can be made as to whether the array needs to be maintained in this position. If the determination is 'Yes', e.g., the weather system still poses a threat to the array and collection components, the method proceeds to 1312, with the array being maintained in the safety position.

At 1314, a further determination is made regarding whether the array can return to a position to recommence collection of the solar energy. If the response is 'No', e.g., the weather system is still a threat to the array components, the method returns to 1312. If, at 1314, it is determined that 'Yes' it is safe to resume operations then the method returns to 1302, and the array is realigned with respect to the sun to recommence collection of the solar energy.

Returning to act 1310, if the determination as to whether to maintain the current safety position is 'No', e.g., the weather system no longer poses a threat to the array and collection components, the method returns to 1302 and collection of the solar energy by the array resumes.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 14:
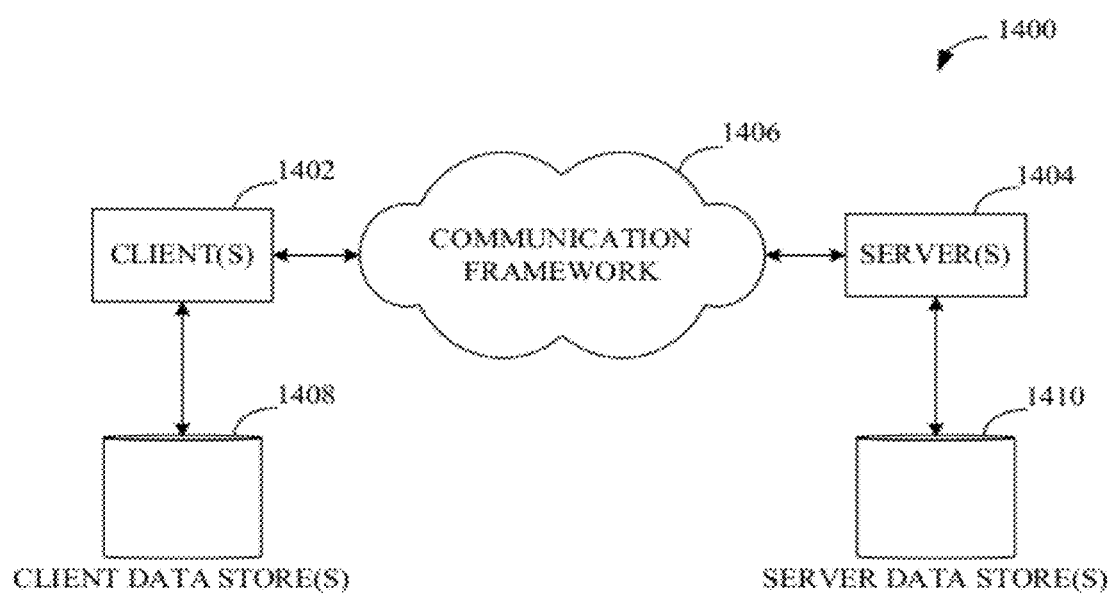
FIG. 14 illustrates an example of a schematic block diagram of a computing environment in accordance with an aspect subject specification.
Figure 15:
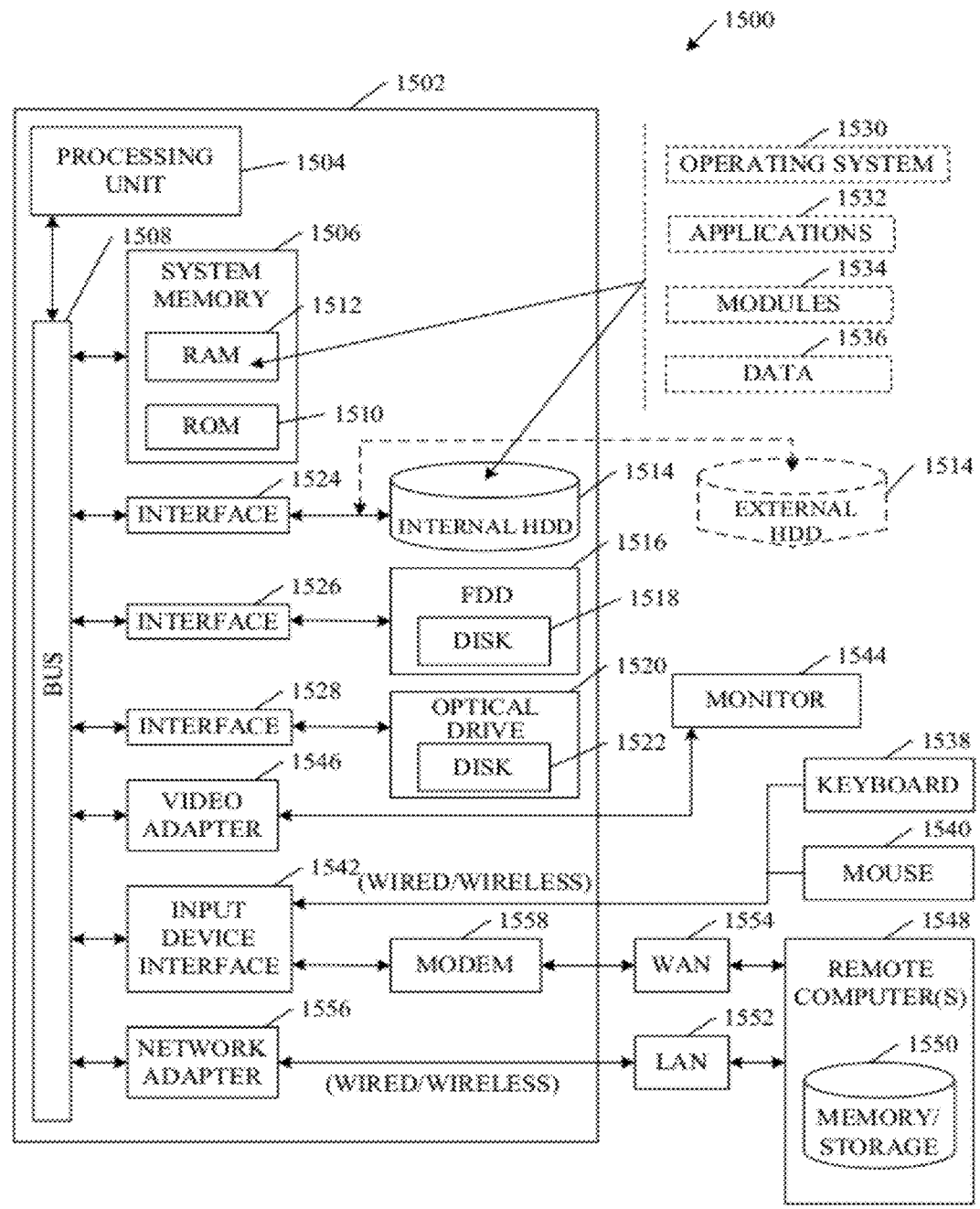
FIG. 15 illustrates an example of a block diagram of a computer operable to execute the disclosed architecture.

In order to provide a context for the various aspects of the disclosed subject matter, FIGS. 14 and 15 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 14 there is illustrated a schematic block diagram of a computing environment 1400 in accordance with the subject specification. The system 1400 includes one or more client(s) 1402. The client(s) 1402 can be hardware and/or software (e.g., threads, processes, computing devices). The client(s) 1402 can house cookie(s) and/or associated contextual information by employing the specification, for example.

The system 1400 also includes one or more server(s) 1404. The server(s) 1404 can also be hardware and/or software (e.g., threads, processes, computing devices). The servers 1404 can house threads to perform transformations by employing the specification, for example. One possible communication between a client 1402 and a server 1404 can be in the form of a data packet adapted to be transmitted between two or more computer processes. The data packet can include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

Referring now to FIG. 15, there is illustrated a block diagram of a computer operable to execute the disclosed architecture. In order to provide additional context for various aspects of the subject specification, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 15, the example environment 1500 for implementing various aspects of the specification includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors or proprietary specific configured processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the specification can be implemented with various proprietary or commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 is connected to the local network 1552 through a wired and/or wireless communication network interface or adapter 1556. The adapter 1556 can facilitate wired or wireless communication to the LAN 1552, which can also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the input device interface 1542. In a networked environment, program modules depicted relative to the computer 1502, or portions thereof, can be stored in the remote memory/storage device 1550. It will be appreciated that the network connections shown are example and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A polar mount, comprising:
   a panel mount that physically couples with an energy collection panel;
   a base structure;
   a polar mount support arm having a first end that physically couples the base and the panel mount, wherein the polar mount support arm is aligned parallel to the axial tilt of Earth's axis;
   a polar mount connecting a second end of the polar mount support arm with the panel mount, wherein the first end and second end are at respective disparate ends of the polar mount support arm, the polar mount further comprising:
   a first positioning component, wherein rotation of the first positioning component facilitates positioning of the energy collection panel about an ascension axis with respect to the motion of the sun across the sky and the center of gravity of the energy collection panel is about the polar mount.

2. The system of claim 1, the polar mount further comprising a second positioning component to facilitate tilting the energy collection panel through a range of angles to position the energy collection panel with respect to an angle of declination of the sun.

3. The system of claim 1, the energy collection panel can be rotated about the to polar mount support arm a position of safety, or to a position to facilitate access for maintenance or installation.

4. The system of claim 1, the alignment of the polar mount support arm can be adjusted to facilitate location of the energy collection panel to a position of safety, or to a position to facilitate access for maintenance or installation.

5. The system of claim 1, further comprising an artificial intelligence component that can assist with determining the position of the polar mount.

6. The system of claim 1, the energy collection panel is a mirrored surface, is a photovoltaic elements, is a energy absorbing material, or a combination thereof.

7. The system of claim 2, the first and second positioning components can be DC brushless stepper motors.

8. The system of claim 3, further comprising a positioning controller that controls the position of the energy collection panel with respect to the sun, wherein the position is facilitated by movement of at least one of the first positioning component or the second positioning component to align the polar mount with respect to the energy collection panel.

9. The system of claim 8, the positioning controller determines the position of the polar mount based upon longitude of the polar mount, latitude of the polar mount, date and time information, calculated position of the sun.

10. The system of claim 3, the alignment of the polar mount support arm can be adjusted to facilitate location of the energy collection panel to a position of safety, or to a position to facilitate access for maintenance or installation.

11. A method, comprising:
    constructing panel a mount coupling to an energy collection panel
    coupling, with a polar mount support arm, the panel mount to a base structure, wherein the panel mount is located at a first position on the polar mount support arm, the first position on the polar mount support arm is a first end of the polar mount support arm and the base structure is located at a second position on the polar mount support arm, the second position on the polar mount support arm being a position between the mid-point along the length of the polar mount support arm and a second end of the polar mount support arm, the first end and the second end at are respective disparate ends of the polar mount support arm; and
    aligning the polar mount support arm parallel with the axial tilt of the Earth's axis, wherein alignment of the polar mount support arm is facilitated by locating the second end of the polar mount support arm with respect to the base.

12. The method of claim 11, further comprising positioning the at least two energy collection panel with respect to the ascension or the declination of the sun.

13. The method of claim 11, further comprising determining an operational position of the energy collection panel based upon the longitude of the energy collection panel, latitude of the energy collection panel, date and time information, calculated position of the sun, or a combination thereof.

14. The method of claim 11, further comprising positioning the energy collection panel in a safety position, wherein positioning facilitated by rotation of the energy collection panel about the polar mount support arm facilitating negating exposure of the energy collection panel to a safety threat.

15. The method of claim 11, further comprising co-locating another energy collection panel with the energy collection panel, wherein the energy collection panel and the another energy collection panel are separated with a gap, with the energy collection panel and the other energy collection panel being located on either side of the polar mount facilitating rotational positioning of the energy panel and the another energy panel about the polar mount.

16. A system, comprising:
   means for constructing a polar mount that can retain at least one energy collection panel;
   means for physically coupling the at least one energy collection panel, wherein the means for physically coupling is a panel mount;
   means for physically coupling the polar mount with a base, wherein the means for coupling is a polar mount support arm having a first end that physically couples the base and the panel mount and the polar mount support arm being aligned parallel to the axial tilt of the Earth's axis; and
   wherein the polar mount connects a second end of the polar mount support arm with the panel mount, wherein the first end and second end are at respective disparate ends of the polar mount support arm, the polar mount further comprising:
   a first positioning component wherein rotation of the first positioning component facilitates positioning of the energy collection panel about an ascension axis with respect to the motion of the sun across the sky and the center of gravity of the energy collection panel is about the polar mount; and
   means for positioning the at least one energy collection panel such that the center of gravity of the at least one energy collection panel and the polar mount align with the axis of the polar mount support arm.

17. The system of claim 16, further comprising:
   means for collecting external input for controlling the position of the at least two energy collection panels; and
   means for controlling the position of the polar mount with respect to the longitude of the at least two energy collection panels, latitude of the at least two energy collection panels, date and time information, calculated position of the sun, or a combination thereof.

18. The system of 16, further comprising:
   means for positioning the at least two energy collection panels in a position of safety, and:
   means for positioning the at least two energy collection panels facilitating access of the at least two energy collection panels for installation and maintenance.

19. The system of claim 18, wherein the means for positioning the at least two energy collection panels comprises at least one of rotating, tilting, lowering, or raising the polar mount, the polar mount support arm, or combination thereof.

20. A polar mount system, comprising:
   panel mount that physically couples with an energy collection panel;
   a base structure;
   a polar mount support arm to physically couple the panel mount to the base structure, wherein the panel mount is located at a first position on the polar mount support arm, the first position on the polar mount support arm is a first end of the polar mount support arm and the base structure is located at a second position on the polar mount support arm, the second position on the polar mount support arm being a position between the mid-point along the length of the polar mount support arm and a second end of the polar mount support arm, the first end and the second end at are respective disparate ends of the polar mount support arm, the polar mount support arm is aligned parallel to the axial tilt of the Earth's axis.

* * * * *